Figure 1A:
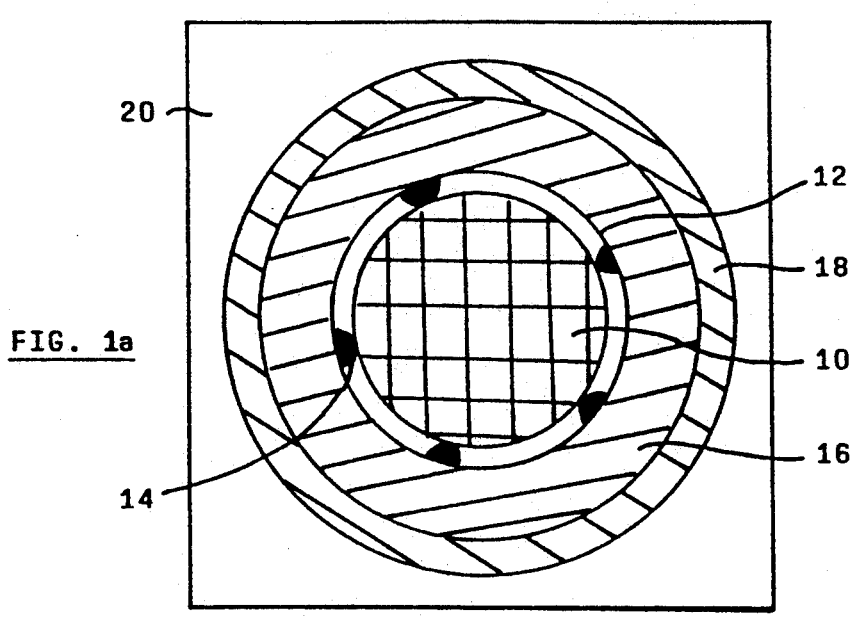

United States Patent [19]
Cappelli et al.

[11] Patent Number: 5,299,785
[45] Date of Patent: Apr. 5, 1994

[54] GAS PURGING PLUG FOR ELECTRIC-ARC FURNACES AND THE CORRESPONDING ELECTRIC-ARC FURNACE

[75] Inventors: Georgio Cappelli, Milan, Italy; Helmut Vacek, Weissenstein, Austria; Ing. Pericle Bosi, Milan, Italy

[73] Assignees: Radex-Heraklith Industriebeteiligungs Aktiengesellschaft, Vienna, Austria; Ing. Leone Tagliaferri & C. S.p.A., Milan, Italy

[21] Appl. No.: 925,602

[22] Filed: Aug. 4, 1992

[30] Foreign Application Priority Data

Aug. 8, 1991 [DE] Fed. Rep. of Germany ....... 4126237

[51] Int. Cl.⁵ ................................................. C21C 5/52
[52] U.S. Cl. .................................. 266/218; 75/10.39; 75/555; 75/558; 75/559

[58] Field of Search ............... 266/218; 75/10.39, 555, 75/558, 559

[56] References Cited

U.S. PATENT DOCUMENTS

| | | | |
|---|---|---|---|
| 4,200,452 | 4/1980 | Savov | 75/10.39 |
| 4,744,546 | 5/1988 | Graf | 266/218 |
| 4,905,971 | 3/1990 | Rothfuss | 266/218 |
| 4,925,166 | 5/1990 | Zimmermann | 266/218 |
| 4,930,757 | 6/1990 | Manwell | 266/218 |
| 4,991,825 | 2/1991 | Struzik | 266/218 |

*Primary Examiner*—Peter D. Rosenberg
*Attorney, Agent, or Firm*—John F. A. Earley; John F. A. Earley III

[57] ABSTRACT

The present invention pertains to a gas purging plug with integrated electrode for use in electric-arc furnaces.

23 Claims, 4 Drawing Sheets

GAS PURGING PLUG FOR ELECTRIC-ARC FURNACES AND THE CORRESPONDING ELECTRIC-ARC FURNACE

The present invention pertains to a gas purging plug for electric-arc furnaces as well as to a corresponding electric-arc furnace. One especially advantageous case of application is directed toward a gas purging plug for a metallurgical electric melting furnace operated with direct current.

D.c. furnaces (d.c. electric-arc furnaces) for metallurgical melting processes have been known for a long time. They compete with electric-arc furnaces which are operated with alternating current.

A d.c. furnace usually has the following design:

There is at least one arc electrode in the upper part (usually in the cover the lower part bottom of the furnace either consists of an electrically conductive, refractory material, such as graphite or metal carbide (EP 0,217,208 A2) or at least one counterelectrode (connected as a cathode) is arranged in the bottom of the furnace (EP 0,135,103 B1). Such a d.c. furnace (also called DC furnace) has the following advantages.

The risk of the arc being interrupted is relatively low even in the case of variations in power supply.

The current flows from the top electrode through the melt and to the bottom electrode. As a result, electromagnetic forces are generated in the melt under the arc. This gives rise to turbulization, during which the melt circulates over the bottom, the sides, and the surface, as a result of which its homogeneity is improved.

The furnace operates with relatively low noise.

A reduced amount of flue gases are formed because of the reduction of the electrode emissions.

The energy consumption is reduced.

To further optimize the melting process, blowing gases, namely, both oxygen and inert gases, into the melt via lances is common practice.

The basic task of the present invention is to show a possibility of how electric-arc furnaces, especially those operated with direct current, can be further improved in terms of their design and their process engineering. The present invention will be described in greater detail below on the basis of a gas purging plug for an electric-arc furnace operated with direct current and on the basis of a corresponding d.c. furnace for metallurgical melting processes. However, the present invention is not limited to these applications. It can also be used in a furnace operated with alternating current and for other purposes as well.

The present invention is based on the consideration of connecting a refractory, ceramic gas purging plug, which is known, in principle, from other metallurgical melting vessels, such as ladles or the like, to an electrode, such as that installed so far in the bottom of d.c. furnaces. Consequently, the basic idea of the present invention is to integrate an electrode within a refractory ceramic body, so that a type of "purging electrode" is formed. The purging gas can be introduced into the metal melt through the plug through the ceramic body, the electrode, and/or canals or slits between the electrode and the ceramic matrix material. The term "purging gas" also includes the simultaneous feeding of solids with a carrier gas, as well as the feeding in of fluids (e.g., kerosene).

As a result, the design in the bottom area of a d.c. furnace is appreciably simplified. It is possible to use conventional, inexpensive qualities for the refractory material, because the entire body of refractory material no longer needs to be electrically conductive, as in the embodiment according to EP 0,217,208 A2. Another advantage is that feeding in gas via separate lances can be eliminated. As is shown, the treating gas is blown directly into the metal melt via the "purging electrode." The passage of gas through the plug at the same time provides for cooling in the electrode area, so that a separate cooling may be omitted. As a result, the electrode wear is reduced at the same time.

In its most general embodiment, the present invention pertains to a gas purging plug for electric-arc furnaces with at least one electrode which extends in the direction of purging of the treating gas within the refractory matrix material and which can be connected to a power source at the gas inlet-side end of the plug.

Such a gas purging plug can be realized in various embodiments.

For manufacturing engineering reasons, it is advantageous for the electrodes to be of a rod-shaped design. The electrodes preferably extend over the entire height of the gas purging plug, i.e., from its gas inlet-side end to its gas outlet-side end.

In the simplest case, this can be achieved by preparing a rod-shaped electrode in a refractory ceramic receiving part with oriented or nonoriented porosity. The ceramic receiving part may be surrounded by a sheet-metal jacket over its circumference and/or on its bottom side, especially if it has nonoriented porosity.

However, it is also possible to provide the refractory matrix material with a longitudinal bore, whose internal diameter is larger than the external diameter of the electrode, so that after insertion of the electrode, an annular gap is formed, through which the treating gas will subsequently be fed in. To achieve accurate positioning of the electrode within the bore, the penetrating bore preferably has inwardly projecting nubs or webs which accurately hold the electrode after it has been inserted. The nubs may be formed, e.g., directly when the ceramic receiving part is cast. The electrode is preferably additionally supported on the bottom side. However, the nubs may also be formed from a metal cylinder that is inserted between the electrode and the refractory material.

It is, of course, possible to arrange a plurality of electrodes rather than one electrode within the ceramic body. This is preferably done such that a symmetrical design will be obtained.

According to an alternative embodiment, the electrode is of cylindrical shape. The cylindrical electrode is then surrounded or filled out with a refractory material both on the outside and the inside. The ceramic material can (also) be used as an active plug in this case by providing, e.g., oriented pores (canals) in the ceramic body.

Details of prior-art ceramic plugs with oriented or nonoriented porosity are described in the *Radex-Rundschau* 1988, 481.

However, the active plug may also be provided in the electrodes proper. For this purpose, the electrodes have at least one penetrating bore extending in the longitudinal direction, so that a type of "oriented porosity" is again formed. This embodiment has the advantage that a particularly efficient cooling of the electrode during purging is achieved.

It seems useful in this embodiment to use a gas purging plug with a single, integrated electrode, which is fixed centrally in the ceramic receiving body. The electrode may be connected to the ceramic body via, e.g., a refractory mortar.

However, the electrode(s) may also have nonoriented porosity.

In all the above-mentioned examples, the electrode should preferably extend over the entire height of the plug. However, this is not absolutely necessary. For example, the upper end face of the electrode(s) may, e.g., also be covered with a thin, refractory, gas-permeable layer.

Regarding the specific design, numerous further possibilities, some of which are presented in the following description of the figures, are available to the person skilled in the art. However, an electrode in a ceramic body is combined into a gas purging plug (a purging electrode) in all embodiments.

When designing the gas inlet-side end of the plug, it is possible to use prior-art designs. These include, e.g., the design of a gas distribution chamber with a gas connection line. Via the central gas connection line, the purging gas is introduced into the distribution chamber, so that a uniform pressure is achieved over the entire purging area. The gas then flows through the pores (canals) to the gas outlet-side end and from there into the melt.

According to a design modification compared with a prior-art ladle plug, the electrode is connected to an electrical power supply unit at the gas inlet-side end, so that corresponding connection possibilities are to be provided in the area of a gas distribution chamber.

The furnace according to the present invention has at least one arc electrode (preferably in the cover) and at least one gas purging plug of the above-mentioned type (preferably in the bottom).

The (bottom-side) gas purging plug may be arranged directly in the (imaginary) axial extension of the arc electrode.

However, it is also possible to arrange a plurality of purging plugs (in the furnace bottom), which is preferably done such that the individual gas purging plugs are arranged at equally spaced locations from one another on an imaginary circle, whose center is located in an imaginary axial extension of the arc electrode.

The difference from the prior-art arc furnaces is consequently the design and the arrangement of the (usually bottom-side) electrode(s). The furnace may otherwise be left unchanged, aside from the fact that separate feeding means for treating gases (e.g., lances) can be eliminated because of the described design.

Not only an additional circulation of the metal melt and consequently homogenization of the melt are achieved due to the possibility of blowing a treating gas in the electrode area over the gas purging plugs described into the melt. Electrode cooling is also provided at the same time, and electrode wear is reduced. The use of the gas purging electrodes described thus permits the melting process to be optimized in general.

Further characteristics of the present invention will become apparent from the subclaims as well as the other application documents.

These include the design of the plug with a means for indicating the degree of wear of the plug, which is arranged in the electrode and/or in the refractory matrix material. One exemplified embodiment will be described below.

The plug may be built in permanently or designed as an interchangeable electrode. It may be prefabricated in a nozzle brick.

The present invention will be explained in greater detail below on the basis of various exemplified embodiments.

BRIEF DESCRIPTION

Figure 1B:
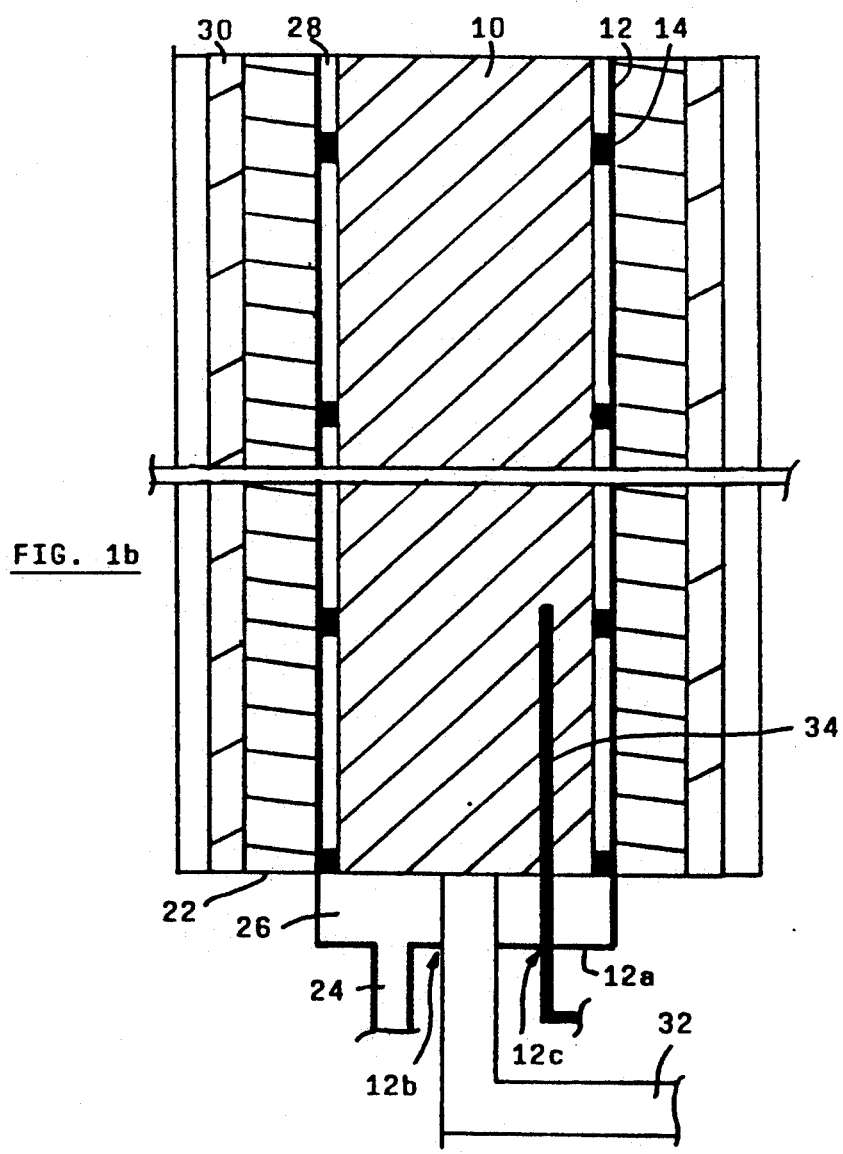
Figure 4:
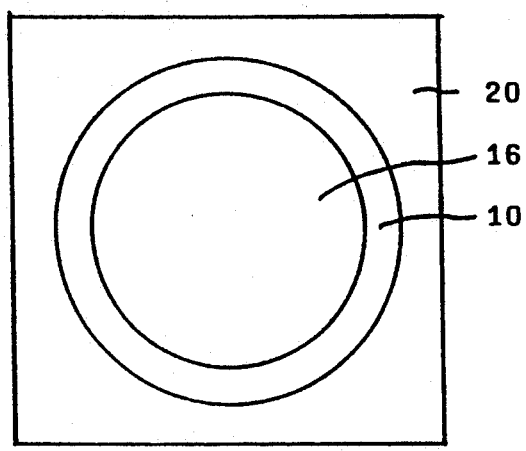
Figure 5:
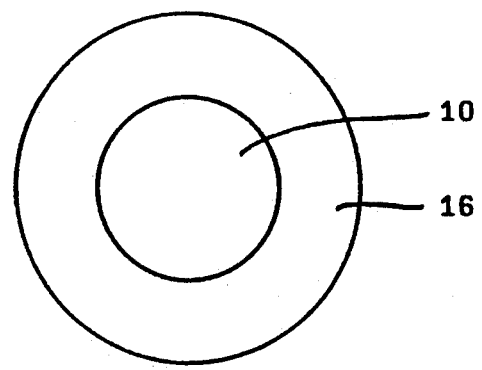
Figure 6:
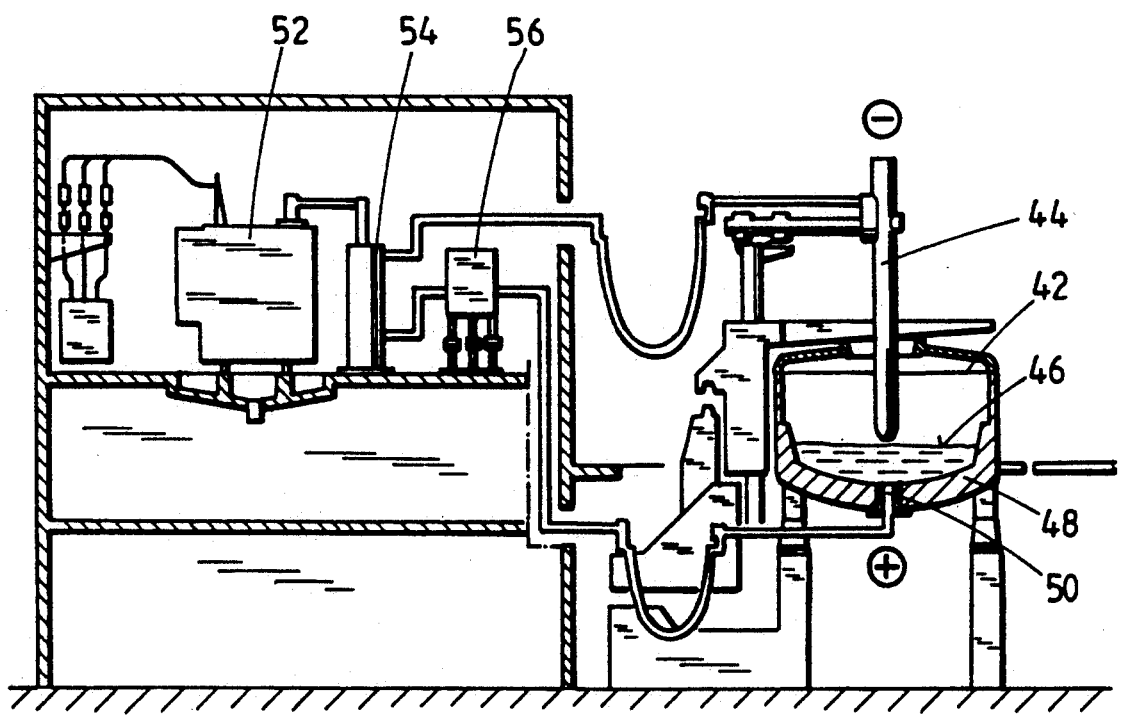

In highly schematic representations,

FIG. 1a shows a horizontal section through a first embodiment of a gas purging plug with integrated electrode, FIG. 1b shows a longitudinal section through the plug according to FIG. 1a, FIGS. 2-5 show four top views of four different further embodiments of a gas purging plug with integrated electrode, and FIG. 6 shows the representation of a d.c. arc furnace with the power supply unit connected.

Identical or functionally identical components are represented with the same reference numerals in the Figures.

The purging electrode according to FIG. 1 consists of a central, rod-shaped electrode 10. A steel pipe 12, which has individual, inwardly projecting nubs, which serve to center the said electrode 10 within the said pipe 12, extends concentrically to and at a spaced location from the said electrode 10.

The pipe is surrounded by a refractory, ceramic body 16, which has the shape of a hollow cylinder.

The assembly unit consisting of the said electrode 10 and the said refractory ceramic body 16 forms the purging electrode according to the present invention, which is arranged in a receiving means 20 on the bottom side via, e.g., a mortar joint 18, and the said receiving means 20 essentially assumes the shape and the function of a (prior-art) nozzle brick.

As can be determined from FIG. 1b, the said pipe 12 is extended in the downward direction beyond the lower end face 22 of the said body 16 and is provided with a gas connection pipe 24 via a bottom 12a. A gas distribution chamber 26 is thus formed, and it first distributes the gas fed in via the said gas connection pipe 24 (during operation) over the cross sectional area of the said pipe 12, so that the treating gas, e.g, argon, will subsequently reach the upper end face 30 and from there, the metal melt, via the annular gap 28 between the said electrode 10 and the said pipe 12.

The said bottom 12a of the said gas distribution chamber 26 has two sealed openings 12b, 12c. An electric connection terminal 32, via which the said electrode 10 is connected to the power supply unit, extends through the said opening 12b. A small metal tube 34, which extends over a finite section into the said electrode 10 and can be connected at its lower, free end to a pressurized gas source (not shown), extends through the said opening 12c.

After installation of the said purging electrode in the bottom of a d.c. furnace, gas/air is admitted into the said small tube 34. However, the gas cannot escape via the upper, free end of the said small tube 34, because the said connected electrode 10 is gastight. However, if the purging electrode has been worn down to the area of the upper, free end of the said small tube 34, the sealing area of the said small tube 34 will melt, and the gas will flow out, which is indicated by a corresponding pressure gauge. The said small metal tube 34 thus assumes the function of a sensor for indicating the wear of the purging electrode.

The embodiment shown in FIGS. 1a and 1b is designed as a "slot purger," wherein the treating gas fed into the metal melt via the said annular gap 28 at the same time cools the said electrode 10, which consists of copper here.

Figure 2:
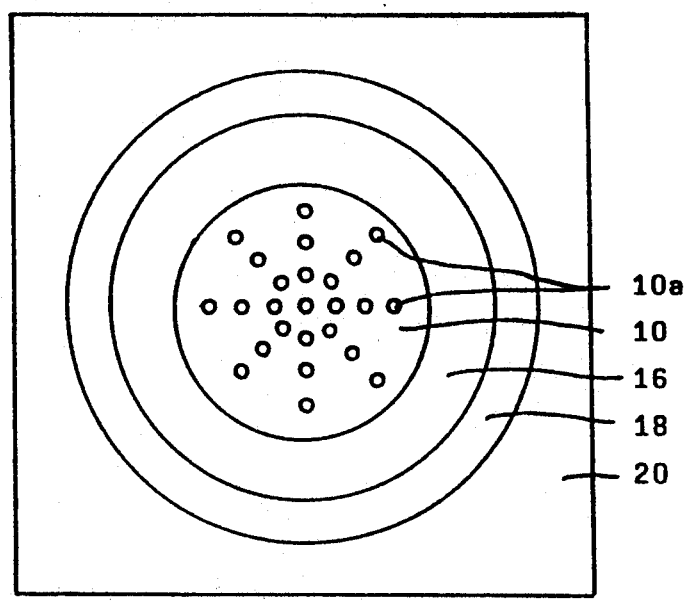

The embodiment according to FIG. 2 differs from that shown in FIG. 1 by the fact that the said copper electrode 10 is directly surrounded by the said ceramic body 16, so that no annular gap (gas gap) is formed here.

Feeding in of gas is achieved here by the said electrode 10 itself being provided with a plurality of longitudinal bores 10a, which extend over the entire length of the said electrode 10. In analogy to the terminology of ceramic gas purging plug, it would also be possible to call the said electrode 10 an electrode with "oriented porosity."

The bottom area of the said electrode 10 is extended in the downward direction in the embodiment according to FIG. 2 as well, so that a gas distribution chamber is formed (not shown), via which the treating gas is introduced into the metal melt through the said canals 10a.

Due to the more or less stochastic distribution of the said gas canals 10a in the said electrode 10, even better cooling effect is achieved than in the embodiment according to FIG. 1.

The purging and cooling capacity can be further increased by designing the said ceramic body 16 [with] oriented or nonoriented porosity and correspondingly enlarging the cross sectional area of the gas distribution chamber or by providing a second gas distribution chamber for the area of the said porous ceramic body 16.

A combination of the embodiments according to FIGS. 1 and 2 would, of course, also be conceivable, i.e., the provision of an annular gap between the said gas-purging electrode 10 according to FIG. 1 and the said outer ceramic hollow cylinder 16.

Figure 3:
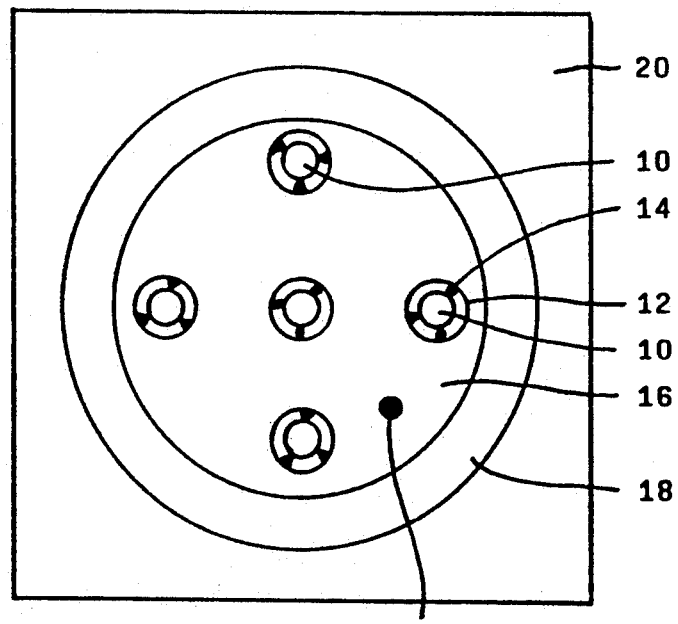

Another variant of embodiment is shown in FIG. 3. A total of five said electrodes 10, which are positioned, similarly to the example according to FIG. 1, in a separate metal pipe 12 each via corresponding nubs 14, are arranged within the said ceramic body 16.

The said steel cylinders 12 are held with mortar in the said body 16 as in the exemplified embodiment according to FIG. 1.

It is obvious that the total of five said electrodes 10 according to FIG. 3 have, on the bottom side, corresponding connection terminals [for connection to] the electrical power supply unit.

The gas distribution chamber is again designed similarly to that described above, but it extends over the entire cross sectional area of the said ceramic body 16 here. For this purpose, the said body 16 is enveloped, at its lower section, with a sheet-metal jacket, which is extended on the bottom side beyond the said lower end face 22 to form the gas distribution chamber.

Precisely in the embodiment according to FIG. 3, it is advantageous to provide the said ceramic body 16 with oriented or nonoriented porosity as well, because the gas pressure acts over the entire cross sectional area of the said body 16 anyway due to the design of the gas distribution chamber.

A residual thickness indicating means 34 is integrated, just as in FIG. 1b, in the ceramic matrix material of the said body 16 in this case as well.

Two simpler variants of embodiment are shown in FIGS. 4 and 5.

According to FIG. 4, the said electrode 10 is designed as a hollow cylinder, and is filled with a said refractory ceramic matrix material 16. The said electrode 10 is directly held with mortar on the outside in a nozzle brick-like support receiving means 20.

A gas distribution chamber extends beneath the actual purging body in this case as well, forming the extension of the outer circumferential surface of the said electrode 10. Both the said electrode 10 and the said inner ceramic body 16 are provided with oriented pores (not shown).

In the embodiment according to FIG. 5, a said electrode 10 is prefabricated in a hollow cylinder-shaped ceramic body 16 with nonoriented porosity.

An annular gas distribution chamber is provided in this case by both the said electrode 10 and the said body 16 being integrated prefabricated in a steel cuff, which is extended beyond the lower end face of both parts and has a bottom in which a gas connection pipe is arranged.

The connection terminal for the said electrode 10 is not led through the gas distribution chamber in this case, but it extends directly in extension of the said electrode 10.

FIG. 6 shows the basic design of a d.c. furnace for metallurgical purposes.

It shows a furnace 40, through the cover 42 of which extends a graphite electrode 44 connected as an anode, which ends at a spaced location above the metallurgical bath level 46.

A gas purging plug 50 of the above-described type, whose electrode 10 is connected as a cathode, is arranged in the bottom 48 made of refractory material (in the imaginary axial extension of the said electrode 44).

The figure also shows the electrical connection elements extending from the said electrodes 10, 44, as well as a transformer 52, a rectifier 54, as well as a smoothing choke 56.

We claim:

1. A gas purging plug and electrode assembly for an electric-arc furnace, comprising
    a gas purging plug comprised at least in part of a refractory matrix material, and having a bottom end portion forming a gas inlet-side end of the gas purging plug and having an upper end portion forming a gas outlet-side end of the gas purging plug,
    a electrode positioned inside the gas purging plug and extending in a direction from the bottom end portion of the gas purging plug to the upper end portion of the gas purging plug, and
    means connected to the electrode for connecting the electrode to a power source.

2. Gas purging plug and electrode assembly in accordance with claim 1, in which the electrode is of rod-shaped design.

3. Gas purging plug and electrode assembly in accordance with claim 1, in which the electrode has at least one penetrating bore (10a) extending preferably in the longitudinal direction.

4. Gas purging plug and electrode assembly in accordance with claim 1, in which the electrode is provided with nonoriented porosity.

5. Gas purging plug and electrode assembly in accordance with claim 1, in which the electrode is surrounded by an annular canal (28) over its entire longitudinal extension and is positioned via centering elements (14) within the annular canal (28) against the refractor matrix material (16).

6. Gas purging plug and electrode assembly in accordance with claim 1, the electrode having a central longitudinal axis that is identical to the central longitudinal axis of the gas purging plug defined by the refractory matrix material (16).

7. Gas purging plug and electrode assembly in accordance with claim 1, further including at least one additional electrode, each electrode of the assembly having a central longitudinal axis extending in parallel to the central longitudinal axis of the plug defined by the refractory matrix material (16).

8. Gas purging plug and electrode assembly in accordance with claim 1, in which the electrode extends at an angle to the central longitudinal axis of the plug defined by the refractory matrix material.

9. Gas purging plug and electrode assembly in accordance with claim 1, further including means at the gas inlet-side end of the gas purging plug for connecting the electrode and/or the refractory matrix material (16), individually or together, to a gas source.

10. Gas purging plug and electrode assembly in accordance with claim 1,
further comprising at least one additional electrode, each electrode of the assembly being surrounded by an annular canal (28) over its entire longitudinal extension and positioned via centering elements (14) within the annular canal (28), and
further including means at the gas inlet-side end of the gas purging plug for connecting each annular canal (28) surrounding an electrode (10) to a separate gas source.

11. Gas purging plug and electrode assembly in accordance with claim 1, the refractory matrix material (16) being provided with oriented pores.

12. Gas purging plug and electrode assembly in accordance with claim 1, the refractory matrix material being provided with nonoriented pores.

13. Gas purging plug and electrode assembly in accordance with claim 1, further including at least one gas distribution chamber (26) arranged at the gas inlet-side end of the plug (50) and having an opening (12b) for gastight connecting of the electrode to the power source (52, 54, 56), said gas distribution chamber including means connected thereto for connecting it to a gas source.

14. Gas purging plug and electrode assembly in accordance with claim 1, further including means (34) integrated in the electrode (10) and/or the gas purging plug for indicating the residual thickness.

15. Gas purging plug and electrode assembly in accordance with claim 1, in which the electrode is designed for connection to a d.c. power source.

16. Gas purging plug and electrode assembly in accordance with claim 1, in which the electrode consists of steel.

17. Electric-arc furnace for melting processes, including at least one arc electrode (44) and at least one gas purging plug and electrode assembly in accordance with claim 1 at a spaced location from the arc electrode (44).

18. Furnace in accordance with claim 17, in which the gas purging plug (50) is arranged in the (imaginary) axial extension of the arc electrode (44).

19. Furnace in accordance with claim 17, in which a plurality of gas purging plug and electrode assemblies are arranged at equal angular distances from one another on an imaginary circle, whose center is located in an imaginary axial extension of the arc electrode.

20. Furnace in accordance with claim 17, further including means for connecting the arc electrode (44) and the electrode of the gas purging plug and electrode assembly to a d.c. power source.

21. A gas purging plug and electrode assembly for an electric-arc furnace, comprising
a gas purging plug comprised at least in part of a refractory matrix material, and having a bottom end portion forming a gas inlet-side end of the gas purging plug and having an upper end portion forming a gas outlet-side end of the gas purging plug,
a plurality of electrode positioned inside the gas purging plug and extending in a direction from the bottom end portion of the gas purging plug to the upper end portion of the gas purging plug, and
means connected to the electrodes for connecting the electrodes to a power source,
in which each electrode is of rod-shaped design,
in which each electrode has at least one penetrating bore (10a) extending preferably in the longitudinal direction,
in which each electrode is provided with nonoriented porosity,
in which each electrode is surrounded by an annular canal (28) over its entire longitudinal extension and is positioned via centering elements (14) within the annular canal (28) against the refractory matrix material (16),
each electrode having a central longitudinal axis that is identical to the central longitudinal axis of the ga plug defined by the refractory matrix material (16),
each electrode of the assembly having a central longitudinal axis extending in parallel to the central longitudinal axis of the plug defined by the refractory matrix material (16),
further including means at the gas inlet-side end of the gas purging plug for connecting the electrodes and/or the refractory matrix material (16), individually or together, to a gas source,
further including means at the gas inlet-side end of the gas purging plug for connecting each annular canal (28) surrounding each electrode (10) to a separate gas source,
the refractory matrix material (16) being provided with oriented pores,
further including at least one gas distribution chamber (26), arranged at the gas inlet-side end of the plug (50) and having an opening (12b) for gastight connection of the electrodes to the power source (52, 54, 56), said gas distribution chamber including means connected thereto for connecting it to a gas source,
further including means (34) integrated in an electrode (10) and/or refractory matrix material of the the gas purging plug for indicating wear,
in which the electrodes are designed for connection to a d.c. power source, and
in which electrodes consists of steel.

22. Electric-arc furnace for melting processes, comprising at least one arc electrode (44) and a plurality of said gas purging plug and electrode assemblies in accordance with claim 21, at a spaced location from the arc electrode (44), the arc electrode (44) having a central longitudinal axis, and said gas purging plug and electrode assembly being aligned with the axis of the arc electrode (44), said gas purging plug and electrode assemblies being arranged at equal angular distances from one another on an imaginary circle whose center is aligned with the axis of the arc electrode (44), and means for connecting the arc electrode (44) and the gas purging plug and electrode assemblies to a d.c. power source.

23. Gas purging plug for electric-arc furnaces, comprising at least one electrode which extends in the longitudinal direction of the gas purging plug from its bottom to its top and being placed within a refractory matrix material and provided at its bottom end to a power source.

* * * * *